Figure 1:
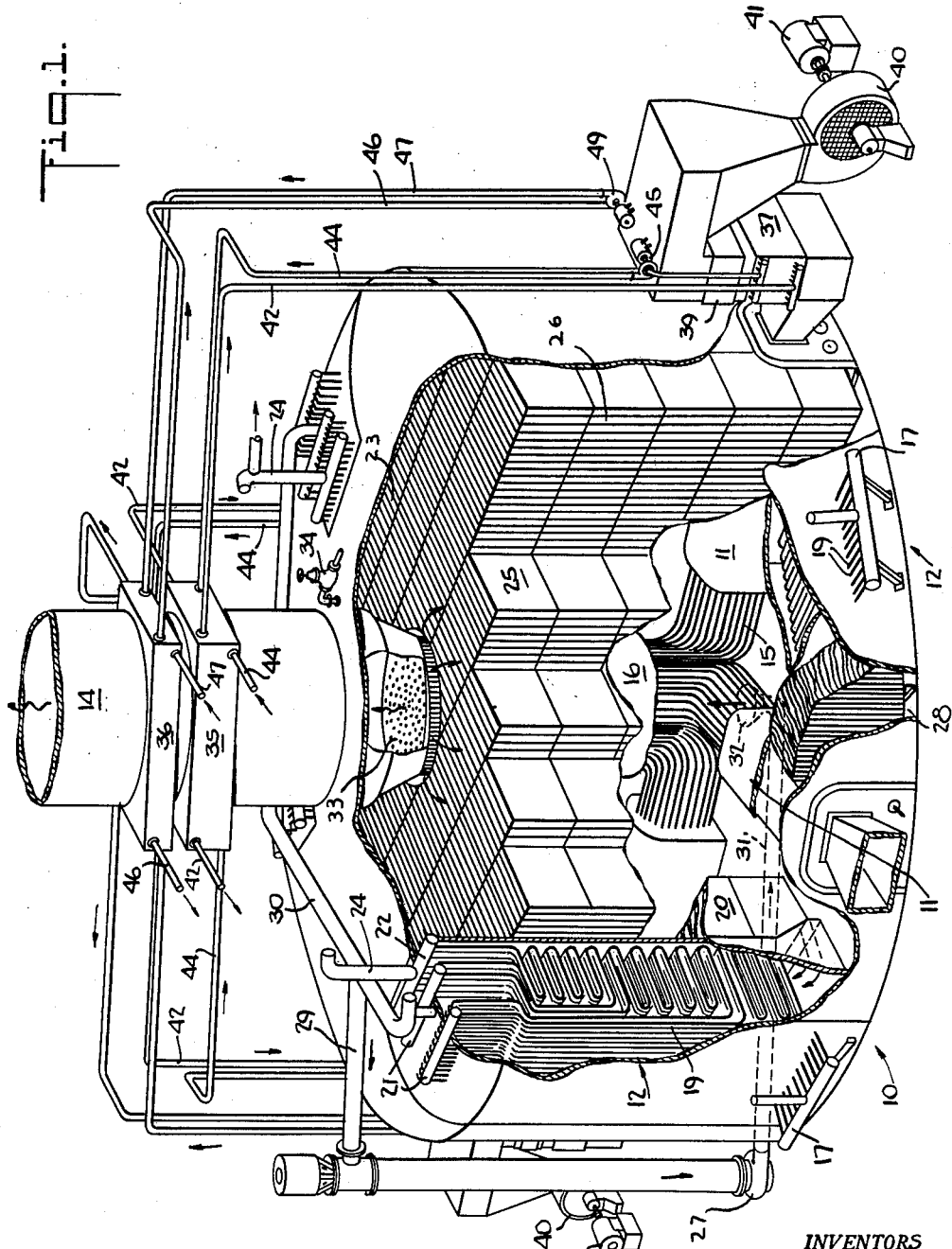

Oct. 29, 1963    R. C. ROE ETAL    3,108,577
HEAT STORAGE AND STEAM GENERATING UNIT
Filed May 22, 1961    2 Sheets-Sheet 2

INVENTORS
RALPH C. ROE
JOSEPH LICHTENSTEIN
BY THOMAS Y. MULLEN

ATTORNEYS

United States Patent Office 3,108,577
Patented Oct. 29, 1963

3,108,577
HEAT STORAGE AND STEAM
GENERATING UNIT
Ralph C. Roe, Tenafly, N.J., Joseph Lichtenstein, Bayside, N.Y., and Thomas Y. Mullen, Summit, N.J., assignors to Burns and Roe, Inc., New York, N.Y., a corporation of New Jersey
Filed May 22, 1961, Ser. No. 111,699
7 Claims. (Cl. 122—33)

This invention relates to the storage of heat for industrial power plant purposes, and more particularly, to apparatus for storing heat during utility off-peak production periods and using such heat for power generation during peak production periods to help meet the peak production requirements of utility sytsems.

At the present time, various utilities are indicating considerable interest in the development of efficient systems for storing heat during off-peak production periods for use during peak periods to help meet power production requirements. Among the primary advantages of such a system is the ability of the utility to maintain storage facilities charged with heat most of which may have been stored during off-peak periods, and to utilize such stored heat during peak periods to produce power to supplement the regular production facilities, thus permitting the highly efficient power production facilities of the utilities to operate more nearly on a base load condition and to reduce the difference between maximum and minimum output in the production cycle so as to operate at a more nearly uniform rate. This in turn will greatly improve the efficiency of the operation and reduce costs.

Systems of this class are known in the art, and much effort has been expended in the development of various operating constructions thereof. However, thus far, none has achieved any appreciable commercial success, primarily because of the exceedingly high capital investment and of the inability of the systems economically to store sufficient heat for efficient use.

Such plants consist generally of furnace and steam generating equipment for use in the conventional manner in addition to a large storage tank containing a heat storing medium, a pass for furnace stack gases in which is positioned a series of heating coils, and means for circulating the heat storing medium from the tank to the coils in the pass so as to heat the medium and return it to the tank. Within the tank there may be provided an inner chamber or compartment containing coil assemblies into which water is introduced. The heat storing medium transfers its heat to the water in the coils to produce steam. Such plants consist of a series of individual units, each completely self-contained and each interconnected with the other by large, costly piping, tubing, valving and other equipment which materially increases the first cost as well as the required maintenance expenses.

We have conceived a completely new and different combination of elements that yield extraordinarily good results by closely coupling the various units within the large storage tank. Thus, as a result of our concept, we are able to eliminate considerable piping, valving, heat exchanger equipment and furnace enclosures all of which result in a considerable reduction of first cost aside from other advantages which will later become apparent. Our concept also enables us to store heat efficiently during off-peak production periods and to utilize the stored heat for the economical generation of power to supplement the usual power production facilities during peak production periods. Thus, the present system embodies desirable fetaures including the ability to store heat at high temperature and at atmospheric pressure thus to provide superheated steam for the prime mover.

In essence, our invention resides in the utilization of a storage tank having upper intermediate and lower zones, a quantity of heat storing medium at atmospheric pressure in the intermediate and lower zones, a heating assembly including furnace means and exhaust gas tubes passing upwardly centrally of the tank in heat exchange relation with the heat storing medium, the tank containing steam boiler means spaced from the center thereof, and means circulating the medium upwardly adjacent the exhaust gas tubes and thence through the lower zone to the boiler means for the generation of steam therein.

As a feature of the present invention, we prefer to subdivide the heating assembly into a plurality of furnaces symmetrically arranged within the tank and having exhaust gas tubes passing inwardly towards the center of the tank and thence upwardly in heat exchange relation with the heat storing medium, the tank also containing a plurality of steam boiler means positioned around the periphery thereof in alternate relation to the furnaces, and means circulating the heat storing medium upwardly adjacent the exhaust gas tubes and thence through the lower zone of the tank to the boiler means to generate steam therein.

As a further feature of the invention, we provide a multi-stage combustion air heater assembly including a pair of surface type heat exchange units positioned in a stack to which the furnace exhaust gas tubes connect and a pair of similar heat exchange units positioned in the path of flow of the furnace combustion air. A heat transfer fluid is circulated between one of the units in the stack and individual units in the path of flow of the combustion air to raise the temperature thereof, and a second heat exchange fluid is circulated between the other of the units in the stack and individual units in the path of flow of combustion air to further increase the temperature thereof, the temperature of the stack gases thereby being substantially reduced. This particular feature provides two distinct advantages. First, it eliminates the need for heavy duct work by transferring as much heat through a small liquid carrying pipe as would otherwise have to be transferred through relatively exceedingly large air or gas conveying duct work. Secondly, considerably higher temperatures are handled with this system than could be handled with direct flue gas to air heat exchangers or with metallic regenerative type heaters in which the metals would warp under the temperatures contemplated here. Actually, we prefer to utilize as the heat absorbing elements, extended surface cast iron or steel tube with expanded cast iron ring type heat exchangers in two sections, with similar heat releasing elements positioned in the air stream going to the furnaces. These heat releasing elements will also be a two-section assembly and may consist of one two-section heat releasing unit serving the combustion air to all burners, or it may consist of individual two-section units for each burner. It may also be sub-divided to heat at different temperatures primary and secondary air for pulverized fuel fired installations. Piping and pumps are provided between the heat absorbing and the heat releasing elements for conducting the fluid therebetween. One of the heat absorbing elements is filled with a high temperature heat transfer fluid which will be heated by the gas stream from the boiler and will be pumped to the heat releasing element where it gives up its heat to the air flowing to the respective furnace, thence to be recirculated to the heat absorbing element. In a similar manner, a somewhat lower temperature heat transfer fluid will be disposed in the second of the heat absorbing elements to absorb heat from the stack gases and then to be pumped to its corresponding heat releasing element in the path of flow of the combustion air in advance of the first mentioned heat releasing section so that the temperature of the air to the furnaces is increased in stages, while the temperature of the stack gases will be reduced to a level desirable for exit to the atmosphere.

A further feature of the proposed arrangement lies in its safety. Most, if not all, heat transfer fluids suitable for extremely high temperatures are solids at normal atmospheric temperatures; that is, when the unit is not operating. Most, of not all, of these solids contract when freezing but only slightly. Therefore, they will do no damage to the apparatus when freezing; but when restarting, unless a heat path is provided so that they are first melted along a vertical path, pressure can be built up under the frozen mass by expansion of the fluid changing from the frozen to the molten state below the surface of the frozen mass which pressure can cause explosion and serious damage. According to our concept this danger is eliminated by the heat path from the furnace to the top of the frozen mass. This path is provided by means of flue gas tubes which melt the material vertically through the entire height of the tank, permitting venting and thereby eliminating buildup of pressure which might be dangerous.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Figure 2:
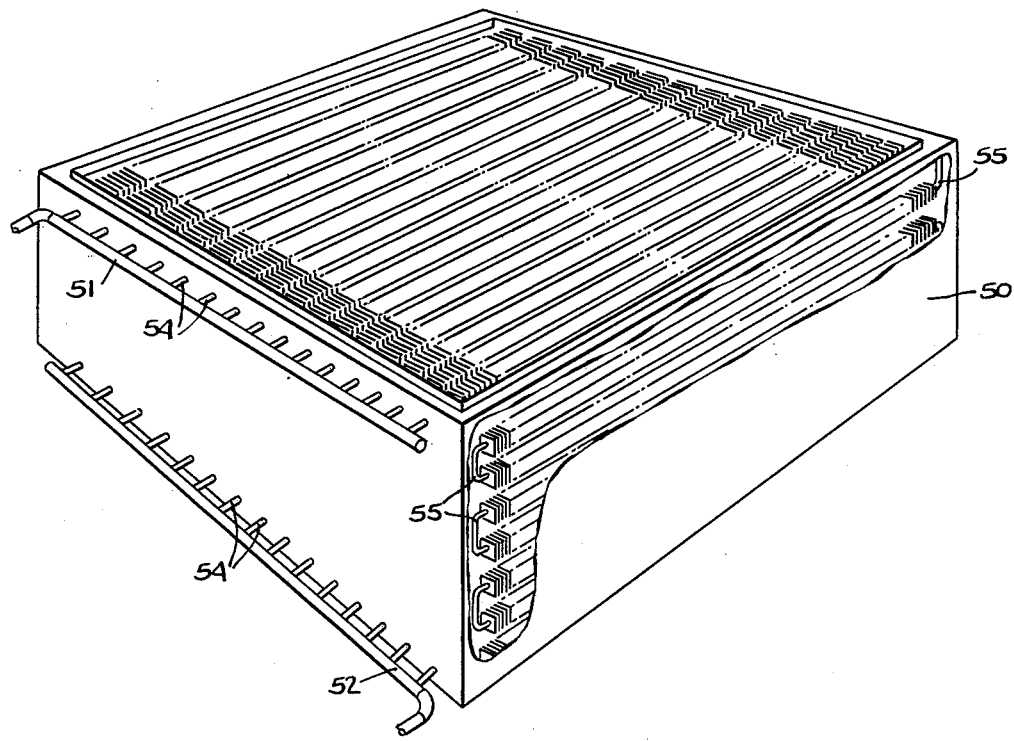

A specific embodiment of the invention has been chosen for purposes of illustration and description, and is shown in the accompanying drawings, forming a part of the specification, wherein:

FIG. 1 is a perspective view, partially broken away for better illustration, of a heat storage and steam generating unit in accordance with the present invention; and FIG. 2 is a perspective view, partially broken away for better illustration, of a heat exchange unit utilized in the air heater assembly.

Referring now to the drawings, and more particularly to FIG. 1 thereof, there is shown a system embodying the present concept and comprising a large non-pressurized tank 10 in which are positioned four equally circumferentially spaced furnaces 11 two of which are shown, and four monotube boilers 12, portions of two of which are shown. These boilers are also equally spaced circumferentially within the tank so as to be positioned in alternate relation with the furnaces. An exhaust gas stack 14 extends upwardly from the center of the tank and each furnace is equipped with a bundle of flue gas tubes 15 which extend from the furnace itself towards the center of the tank 10 and then turn upwardly to pass through a vertically disposed tubular shield 16 towards the stack 14, all for a purpose to be described.

Each of the steam boilers 12 comprises a feed water inlet manifold 17 from which water is fed to a plurality of boiler tubes 19 each formed in a series of loops within the confines of a boiler shell 20 within the tank 10 and being connected to intermediate headers 21 at the top of the tank. Steam generated in the boilers 12 is delivered to a main header 22 at the top of each boiler exterior of the tank 10, and then to a main steam outlet 24 for delivery of steam to prime movers (not shown).

As has already been stated, the tank 10 contains a large quantity of heat storage medium which is heated and circulated relatively to the boiler tubes to produce steam. Actually, for purposes of economy, we prefer to utilize as a heat storing medium, a series of closely spaced slabs 25 of relatively inexpensive, solid material such as soapstone, cyclone furnace or other slag of high density, concrete, gravel, or other material having high heat storage and transfer characteristics; and a fluid medium having desirable charcteristics, such as the ability to absorb and transfer heat at high temperature and atmospheric pressure. Such a medium is marketed by E. I. du Pont de Nemours & Co., Inc., under the name "Hitec." The slabs of solid heat storing medium may, for example, be about three inches thick and spaced about one-half inch apart.

Actually, the tank 10 is divided into an upper zone 23, an intermediate zone 26 containing the furnaces, boilers and slabs, and a shallow lower zone 28 at the bottom of the tank.

A circulating pump 27 is positioned outside of the tank 10 and has its intake line 29 connected to a manifold pipe 30 which is in turn connected to the upper region above each boiler within the respective shells 20. The discharge end of the pump includes a conduit 31 extending radially of the tank along its bottom and terminating in an upwardly facing flared opening 32 centrally of the grouped bundles of flue gas tubes 15.

The liquid level in the top zone 23 is maintained higher than the top of the flue gas tubes 15 so that these tubes will always be submerged in heat storage liquid to keep the metal cool enough so it will not overheat and further to keep the tube sheet 33 in contact with the heat storage liquid for the same purpose. There will be a small space between the top of the liquid level and the top of tank 10 to allow for the expansion and contraction of the liquid as it heats and cools.

The top of the tank 10 is equipped with a valved gas line 34 by means of which a blanket of nitrogen may be maintained above the fluid heat storage material, to maintain it out of contact with atmospheric oxygen.

In operation, the furnaces 11 burn fuel continuously to generate hot flue gases which are conducted through the flue gas tubes 15 to the stack 14. Since the free space in the tank 10 is substantially filled with fluid heat storing medium which is in contact with the tubes 15, heat is transferred to the fluid within the shield 16.

The pump 27 draws the fluid medium into the manifold pipe 30 from the upper zone of each steam boiler, and discharges it through the flared opening 32 at the end of return conduit 31 beneath the hot flue pipes 15. The medium thus moves upwardly along the surfaces of the closely spaced pipes 15 within the shield 16, absorbing heat from the pipes, and flows outwardly from the top of the shield, as indicated by the arrows, and downwardly between the slabs 25 of solid heat storing medium, thus transferring heat to the slabs for storage therein. The fluid medium moves downwardly past the slabs and into the lower zone 28 of the tank 10 and thence into the boiler shells 20 and upwardly in direct heat exchange contact with the looping boiler tubes 19 to manifold pipe 30, thus completing its circulating cycle.

As has been stated, the furnaces operate continuously and, during off-peak periods, the pump 27 circulates the fluid heat storing medium at a slow rate whereby to prevent stratification of the fluid in layers of different temperatures in the tank, and to enable the fluid and solid media to absorb heat. At the same time, the turbines (not shown) may be kept running at speed and synchronized with the generator end of the system, but under no load conditions, by supplying a necessary small amount of feed water to the boilers for steam generation. In such a situation an eocnomical standby condition for instant power is maintained, the furnaces making up the no-load turbine losses and any radiation losses, while also increasing the net stored heat. As an alternative condition, steam may be generated at full pressure but not expanded in the turbines so that the heat available for storage during off-peak periods is that generated by the furnaces less that needed to make up radiation losses.

In this case, of course, a few minutes would be required to bring the turbines up to speed when the need arises, and the pressure would be controlled by suitable pressure control means. As still a further alternative, the boiler tubes could be kept free of water until power was needed, at which time feed water would be admitted to the boilers to provide the necessary steam; or one or more tubes of one boiler could provide steam to keep the turbine spinning while the remaining tubes are kept empty until more steam is needed.

During the peak production period, the speed of operation of the pump 27 may be increased to increase the flow rate of fluid heat storage medium through the boilers and the flow rate of boiler feed water will be increased to produce the desired quantity of steam at selected temperature and pressure conditions. It is preferred that the boiler feed water pass through the boilers in a parallel arrangement, as shown, but it will be understood that it could well be conducted to the respective boilers in a series arrangement, if desired. It will be evident that during the peak period more heat will be taken from the heat storing medium than it will receive from the flue gases. Consequently its temperature will drop to a minimum at the end of this period. We prefer to circulate the liquid heat storing medium at all times during the production period at a rate sufficient to meet maximum load requirements at its lowest working temperature, and to control power output by controlling the flow of boiler feed water.

For protection of the turbines against steam at excessive superheat which might develop during the period of maximum temperature of the heat storage medium a conventional desuperheater may be provided in the steam line 24 for automatic actuation when the steam temperature exceeds a predetermined value.

As has already been stated, the present concept also embodies provision of a multi-stage combustion air heater assembly which transfers heat from the stack gases to the furnace combustion air. As shown in FIG. 1, this assembly includes a pair of heat absorbing elements 35 and 36 positioned in the path of stack gases, and pairs of heat releasing elements 37 and 39 positioned in the path of combustion air supplied to each furnace by blowers 40 drive by motors 41. The heat absorbing element 35 is connected to the heat releasing elements 37 by fluid conduits 42 and 44 for the circulating therebetween by pumps 45 of a fluid heat storage and transfer medium which may, for example, be the same fluid medium as has already been described as being utilized in the tank 10.

It has also been stated that, because of the high temperatures contemplated, a direct flue gas to air heat exchanger in not feasible. It a typical case, the flue gases entering the stack will be well over 1000° F. and the fluid circulated between the absorbing element 35 and release elements 37 may vary between minimum and maximum temperatures of 350° and 1000° F. heating the combustion air from 270° to 970° F., for example.

The heat absorbing element 36 is connected to the heat release elements 39 by conduits 46 and 47 for the circulation therebetween by pumps 49 of a relatively low temperature heat exchange medium such as water under low pressure, for example, which may be heated from 150° to 350° F. by stack gases that have already given up some of their heat passing through element 35. The water is conducted to elements 39 positioned upstream of the elements 37, where it heats the combustion air from about 70° to about 270° F. in the typical installation, the stack gases going to atmosphere at about 300° F.

As shown in FIG. 2, the elements 35, 36, 37 and 39 each comprise a shell 50 open at its upper and lower ends for the flow of stack gases therethrough on the one hand, and combustion air on the other hand, depending upon whether they are used as heat absorbing or heat releasing elements. The heat transfer fluid medium enters and leaves the shell through inlet and outlet manifolds 51 and 52, respectively, which are connected by means of tap lines 54 to a series of finned, cast iron or steel tubes 55 disposed in a plurality of loops in the shell. In FIG. 2, the outer shell shown in FIG. 1 is removed to illustrate the manifolds and tap lines. An expansion tank (not shown) may be provided at a suitable point in the high temperature fluid line to allow for expansions of the fluid, and a nitrogen blanket may be placed above the level of fluid in the expansion tank to prevent contact of atmospheric oxygen with the fluid. Fluid passing through the tubes in the heat absorbing elements 35 and 36 will absorb heat from the exhaust gases in the stack, and will release heat to the combustion air as it passes through the tubes in the heat releasing elements 37 and 39. Actually, in many cases, the heat releasing elements may be of the thin tube, extended surface type wherein cast iron is not necessary inasmuch as air is not corrosive. As has been mentioned the heat releasing elements may be sub-divided to heat at different temperatures primary and secondary air for pulverized fuel-fired installations.

From the foregoing description, it will be seen that we have contributed a novel system of the class described embodying a combination of closely coupled units within a large tank, as a result of which we are able to eliminate considerable piping, valving, heat exchanger equipment and furnace enclosures with a resultant considerable reduction in first cost, while also contributing a plant which efficiently stores heat during off-peak production periods for utilization during peak production periods in the generation of power. It will also be seen that we contribute a combustion air heater assembly whereby we utilize the heat of the exhaust stack gases to heat furnace combustion air while substantially reducing the stack gas temperature, such assembly eliminating the need for heavy duct work and, at the same time, handling considerably higher temperatures than could be handled with direct flue gas to air heat exchangers or with metallic regenerative type heaters.

We believe that the construction and operation of our invention will now be understood, and that the advantages thereof will be fully appreciated by those persons skilled in the art.

We now claim:

1. In a system of the class described, a storage tank, a quantity of heat storing medium in said tank, a heating assembly in said tank including a plurality of furnaces symmetrically arranged around the periphery of said tank and having exhaust gas tubes passing inwardly adjacent the bottom of said tank towards the center of the tank and thence upwardly in heat exchange relation with said heat storing medium to provide a heat exchange path extending substantially throughout the depth of the heat exchange medium, an exhaust stack receiving gases from said tube, said tank containing a plurality of steam boiler means positioned around the periphery thereof in alternate relation to said furnaces, and means circulating said medium upwardly adjacent said exhaust gas tubes and thence downwardly to the bottom of said boiler means and upwardly therethrough for the generation of steam therein.

2. In a system of the class described, a storage tank, a quantity of heat storage material within said tank, said material being characterized by being in the solid state at normal temperatures, a heating assembly including a furnace and exhaust gas tubes passing therefrom upwardly centrally of said tank in heat exchange relation with said heat storing medium to transfer heat to said medium sufficient to bring the temperature thereof well above its melting point, said tank containing steam boiler means spaced from the center thereof, and means effecting circulation of said melted medium upwardly adjacent said exhaust gas tubes thence downwardly to the bottom of said steam boiler and upwardly therethrough for the generation of steam therein.

3. In a system of the class described, a storage tank, a quantity of heat storage material within said tank, said material being characterized by being in the solid state at normal temperatures, a heating assembly including a furnace and exhaust gas tubes passing therefrom upwardly centrally of said tank in heat exchange relation with said heat storing medium to transfer heat to said medium sufficient to bring the temperature thereof well above its melting point, said tank containing steam boiler means including a boiler shell spaced from the center of said tank, and means including a shield surrounding the upwardly extending portion of said exhaust tubes, and pump means communicating with the upper region of said steam boiler means within said boiler shell and also with the center of said tank below said exhaust tubes for effecting circulation of said melted medium upwardly within the confines of said shield and adjacent said exhaust gas tubes to absorb heat therefrom and thence downwardly to the bottom of said steam boiler and upwardly therethrough within the confines of said shell for the generation of steam therein.

4. In a system of the class described, a storage tank, a quantity of heat storage material within said tank, a heating assembly including furnaces and exhaust gas tubes passing therefrom radially towards the center of said tank and thence upwardly centrally of said tank in heat exchange relation with said heat storing medium to transfer heat to said medium, a plurality of steam boiler means spaced from the center of said tank and in alternate relation with said furnaces, and means including a pump circulating said medium upwardly adjacent said exhaust tubes, thence downwardly and radially outwardly to the bottom of said boilers, up therethrough for the generation of steam therein and finally to the center of said tank below said exhaust gas tubes.

5. In a system of the class described, a storage tank, a quantity of heat storing medium in said tank, a heating assembly including a plurality of furnaces symmetrically arranged around the periphery of said tank and having exhaust gas tubes passing inwardly adjacent the bottom of the tank towards the center thereof and thence upwardly in heat exchange relation with said heat storing medium and an exhaust stack communicating with said tubes, a plurality of steam boiler means positioned around the periphery of said tank in alternate relation to said furnaces, means circulating said heat storing medium upwardly adjacent said exhaust gas tubes and thence downwardly to said boiler means for the generation of steam therein, and multi-stage combustion air heater means including means supplying combustion air to said furnaces, a pair of heat exchange units positioned in said stack, heat exchange units positioned in the path of flow of furnace combustion air, means circulating heat transfer fluid between one of said units in said stack and individual units in the path of flow of the combustion air to raise the temperature thereof, and means circulating a second heat exchange fluid between the other of said units in said stack and individual units in the path of flow of the combustion air further to increase the temperature thereof.

6. In a system of the class described, a storage tank having an outer wall, a quantity of heat storing medium in said tank, said medium being constituted at least in part of a high heat transfer material that is in the fluid state at operating temperature, a heating assembly including a furnace positioned adjacent said outer wall of said tank and exhaust gas tubes passing from said furnace radially towards the center of said tank and thence upwardly centrally of said tank in heat exchange relation with said heat storing medium, said tank containing steam boiler means spaced radially from the center thereof and adjacent said outer wall thereof, and means circulating said fluid material upwardly adjacent said exhaust gas tubes and thence through said tank to said boiler means and in heat transfer therewith for the generation of steam therein.

7. In a system of the class described, a storage tank, a quantity of heat storing medium in said tank, a heating assembly including a plurality of furnaces symmetrically arranged around the periphery of said tank and having exhaust gas tubes passing inwardly adjacent the bottom of the tank towards the center thereof and thence upwardly in heat exchange relation with said heat storing medium and an exhaust stack communicating with said tubes, a plurality of steam boiler means positioned around the periphery of said tank in alternate relation to said furnaces, means circulating said heat storing medium upwardly adjacent said exhaust gas tubes and thence downwardly to said boiler means for the generation of steam therein, and combustion air heater means including means for supplying combustion air to said furnaces, heat exchange means positioned in said stack, heat exchange means positioned in heat exchange disposition relative to said surface combustion air supplying means, means circulating heat transfer liquid between said heat exchange means in said stack and said means in heat exchange disposition relatively to said supplying means to raise the temperature of the combustion air.

References Cited in the file of this patent

UNITED STATES PATENTS

| | | |
|---|---|---|
| 1,833,130 | Roe | Nov. 24, 1931 |
| 1,959,286 | Grebe | May 15, 1934 |
| 2,048,393 | Kroger | July 21, 1936 |
| 2,699,758 | Dalin | Jan. 18, 1955 |